United States Patent [19]
Gulik et al.

[11] Patent Number: 6,026,157
[45] Date of Patent: *Feb. 15, 2000

[54] DEVICE FOR UPGRADING A REPORTING SYSTEM

[75] Inventors: Kenneth J. Gulik, Westchester; Michael C. Hollatz, Villa Park; Dale Paney, Lombard, all of Ill.

[73] Assignee: Rockwell International Corp., Costa Mesa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,932

[22] Filed: May 1, 1996

[51] Int. Cl.[7] .......................... H04M 1/24; H04M 15/00; H04M 3/42; H04M 3/00; G06F 15/00

[52] U.S. Cl. ............................... 379/265; 379/9; 379/10; 379/11; 379/34; 379/112; 379/121; 379/126; 379/201; 379/207; 379/218; 379/230; 379/242; 379/265; 379/266; 379/309; 395/155; 395/408

[58] Field of Search ...................... 379/265, 266, 379/309, 218, 279, 242, 201, 207, 230, 9, 10, 11, 34, 112, 121, 126; 395/155, 408

[56] References Cited

U.S. PATENT DOCUMENTS

| 4,233,471 | 11/1980 | Butcher et al. | 178/69 G |
| 4,510,351 | 4/1985 | Costello et al. | 179/27 D |
| 5,333,183 | 7/1994 | Herbert | 379/112 |
| 5,535,256 | 7/1996 | Maloney et al. | 379/34 |

*Primary Examiner*—Fan S. Tsang
*Assistant Examiner*—Allan Hoosain
*Attorney, Agent, or Firm*—Welsh & Katz, Ltd.

[57] ABSTRACT

A device for upgrading a reporting system (12) associated with an automatic call distributor (10) in a telephone system having a first utility program for saving a plurality of custom reports to a temporary directory, an upgrade of the reporting system (12), and a second utility program which imports the custom reports from the temporary directory into the upgrade of the reporting system (12).

7 Claims, 1 Drawing Sheet

DEVICE FOR UPGRADING A REPORTING SYSTEM

BACKGROUND OF THE INVENTION

The present invention relates to a device for upgrading a reporting system associated with an automatic call distributor in a telephone system.

In the past, telephone systems have been known comprising an automatic call distributor (ACD) associated with a reporting system for displaying and printing information from the ACD. The reporting system generally comprises a computer. When it is desired to upgrade the reporting system, the procedures are very time consuming and difficult to perform without causing errors to the system.

First, the customer or user of the system must manually keep track of all custom reports which are programs created by the customer or user in the reporting system. Then the customer installs the upgrade software into the reporting system. Next, the customer must create a "temp" report for each custom report to be inserted into the new system. The customer must then copy custom reports over to the "temp" report and manually edit file names to reflect the new custom report.

This procedure may take a few hours to complete, and is prone to error. Thus, it is desired to simplify this procedure.

SUMMARY OF THE INVENTION

A principal feature of the present invention is the provision of a device which simplifies the upgrading of a reporting system associated with an automatic call distributor in a telephone system.

The device comprises, means for forming a first utility program for saving a plurality of custom reports to a temporary directory, and means for forming an upgrade of the reporting system.

A feature of the present invention is the provision of means for forming a second utility program which imports the custom reports from the temporary directory into the upgrade of the reporting system.

Another feature of the invention is that the device greatly reduces the time required to perform this procedure from a few hours to a few minutes.

Yet another feature of the invention is that the device makes this procedure greatly simplified.

Still another feature of the invention is that the device eliminates errors otherwise resulting from the prior procedures.

Further features will become more fully apparent in the following description of the embodiments of this invention, and from the appended claims.

DESCRIPTION OF THE PREFERRED EMBODIMENTS

Figure 1:
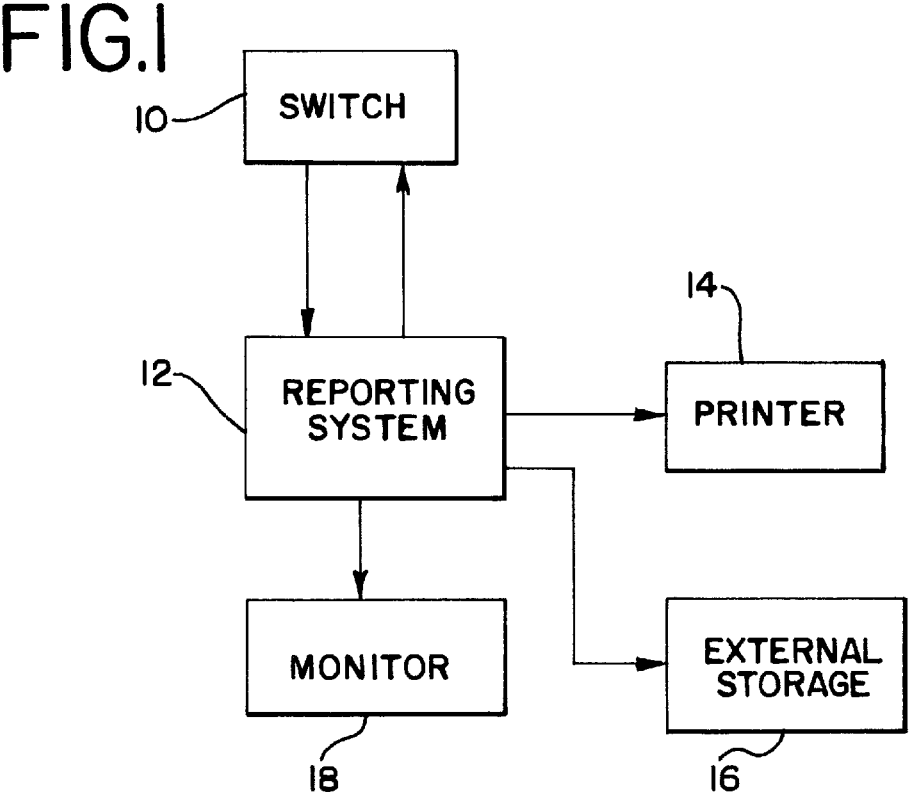
FIG. 1 is a block diagram of a telephone system including an automatic call distributor.

Referring now to FIG. 1, there is shown a telephone system having an Automatic Call Distributor (ACD) or switch 10 which communicates with a reporting system 12. Generally, the reporting system comprises a computer having a program, and the customer or user can create programs for the reporting system, termed custom reports. As shown, the reporting system 12 has a printer 14 for printing reports, an external storage 16, and a monitor 18 for input and display.

Figure 2:
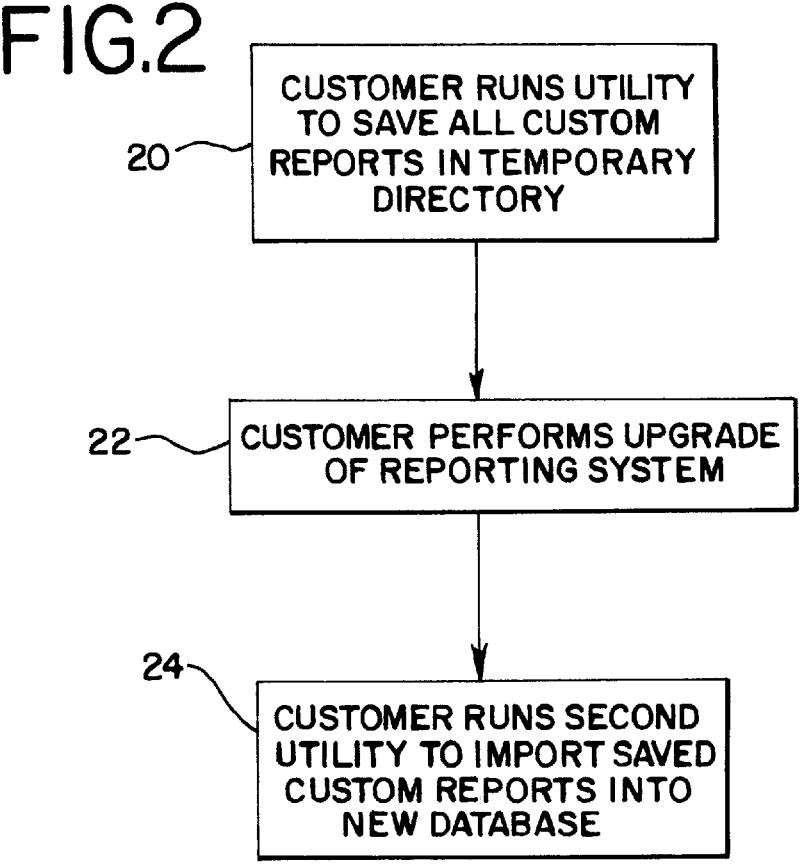
FIG. 2 is a flow chart showing the device for upgrading a reporting system of the present invention.

With reference to FIG. 2, a flow chart of the device of the invention is shown. In box 20, the customer runs a first utility program to automatically save all the custom reports of the reporting system 12 in a temporary directory.

Next, in box 22, the user performs an upgrade of the software of the reporting system 12 by filling in a new release of an upgrade program for use in the reporting system 12. If the custom reports are not saved in the temporary directory, then the custom reports would be destroyed by filling in the upgrade program.

Finally, in box 24, the customer runs a second utility program to import the saved custom reports from the temporary directory into a new database or the upgrade program.

This procedure of saving the custom reports has reduced the time consumed in making the upgrade from a few hours to a few minutes, and has eliminated the possibility of performing errors in the procedure.

The foregoing detailed description has been given for clearness of understanding only, and no unnecessary limitations should be understood therefrom, as modifications will be obvious to those skilled in the art.

What is claimed is:

1. A device for upgrading a reporting system associated with an automatic call distributor in a telephone system, wherein the automatic call distributor communicates with the reporting system, and wherein the reporting system comprises a computer having a program, and a user can create a plurality of custom reporting programs for the reporting system, comprising:

means for forming a first utility program for saving the custom reporting programs to a temporary directory;

means for forming an upgrade of the reporting system; and means forming a second utility program which imports the custom reporting programs from the temporary directory into the upgrade of the reporting system.

2. The device as set forth in claim 1, wherein the reporting system further comprises a printer.

3. The device as set forth in claim 1, wherein the reporting system further comprises as external storage.

4. The device as set forth in claim 1, wherein the reporting system further comprises a monitor.

5. A device for upgrading a reporting system associated with an automatic call distributor comprising:

an automatic call distributor switch;

a computer including a storage device, the computer coupled to the switch and programmed with custom reporting programs, the computer also programmed to automatically save a plurality of the custom reporting programs in a temporary directory prior to performing a reporting system upgrade with an upgrade program, and configured to run a utility program to import the custom reporting programs in the temporary directory into the upgrade.

6. The device of claim 5, wherein the computer is configured to permit a user to create the custom reporting programs.

7. A method for upgrading a reporting system on a computer associate with an automatic call distributor comprising:

provisioning custom reporting programs created by a user to run on the reporting system;

automatically saving a plurality of the custom reporting programs in a temporary directory prior to performing an upgrade of the reporting system;

upgrading the reporting system by filling in a new release of an upgrade program in the reporting system;

importing the saved custom reporting programs from the temporary directory into the upgrade program.

* * * * *